United States Patent
Maxwell

[15] 3,703,939
[45] Nov. 28, 1972

[54] PORTABLE TREE STAND

[72] Inventor: Edward Ralph Maxwell, 607 W. Pope Street, Dunn, N.C. 28334

[22] Filed: Jan. 15, 1971

[21] Appl. No.: 106,747

[52] U.S. Cl. ............... 182/107, 182/116, 182/178, 182/214
[51] Int. Cl. .................................. E06c 1/10
[58] Field of Search ........ 182/116, 93, 214, 187, 178, 182/107

[56] References Cited

UNITED STATES PATENTS

| 550,175 | 11/1895 | Holden | 182/178 |
| 3,057,431 | 10/1962 | George | 182/116 |
| 1,278,433 | 9/1918 | Burn | 182/108 |
| 3,349,870 | 10/1967 | Lieblein | 182/228 |

FOREIGN PATENTS OR APPLICATIONS

| 25,635 | 9/1906 | Austria | 182/116 |
| 809,611 | 7/1951 | Germany | 182/187 |

Primary Examiner—Reinaldo P. Machado
Attorney—Victor J. Evans & Co.

[57] ABSTRACT

A portable tree stand for hunters use formed of a plurality of sections detachably secured together to support a seat section extending horizontally from the top of the erected sections to engage a tree. A chain and turnbuckle system encompasses the tree and draws a spike carrying bar into engagement with the tree with the spikes embedded in the tree.

4 Claims, 8 Drawing Figures

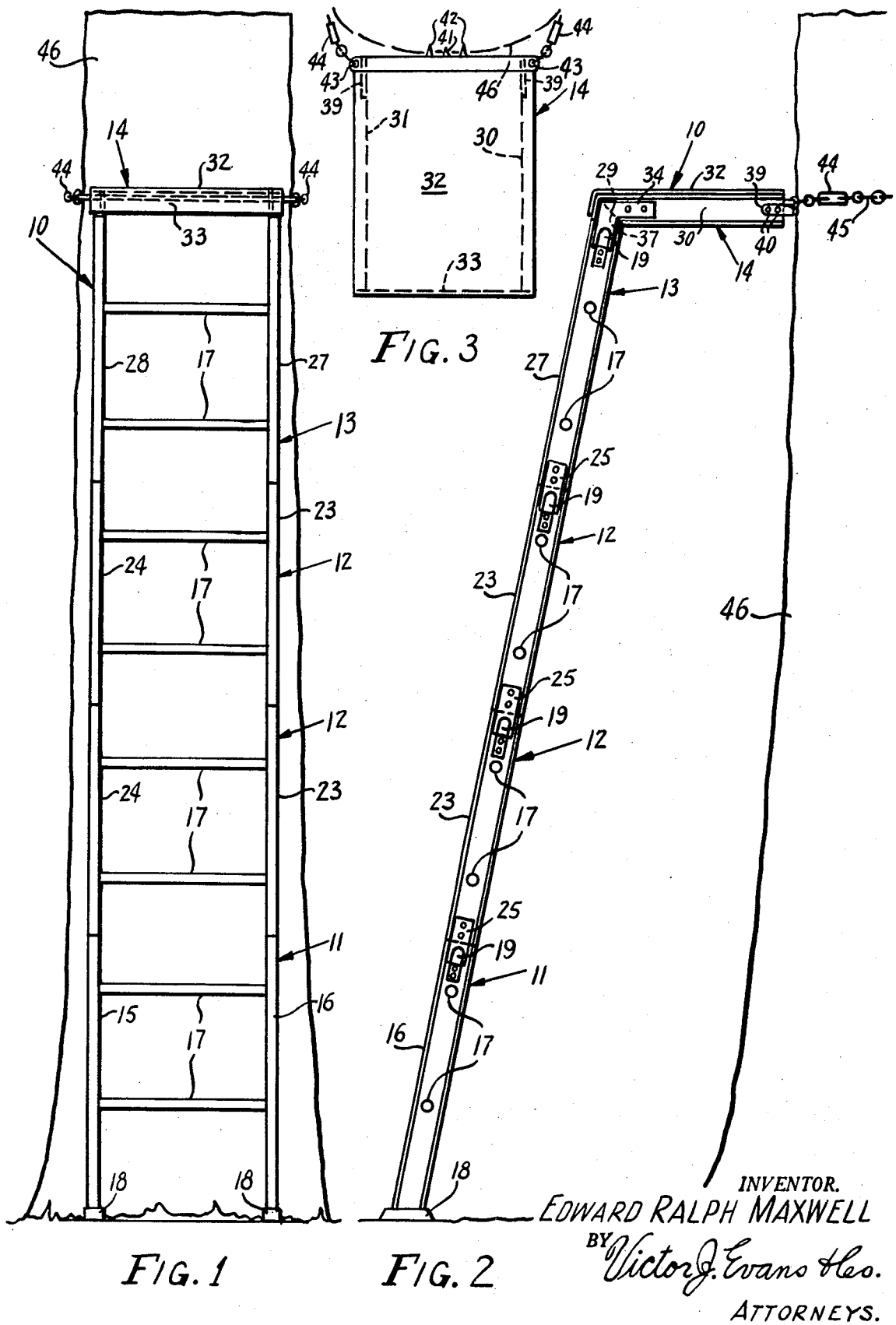

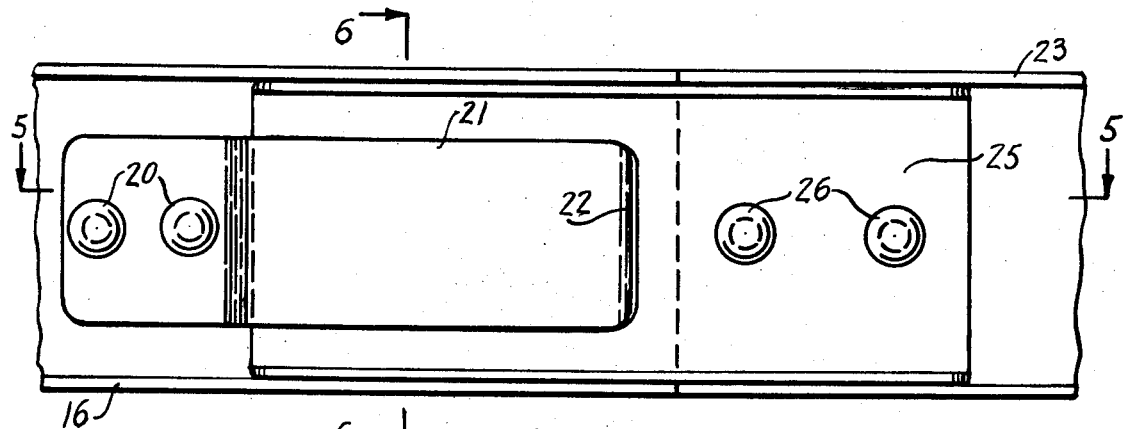
Fig.4
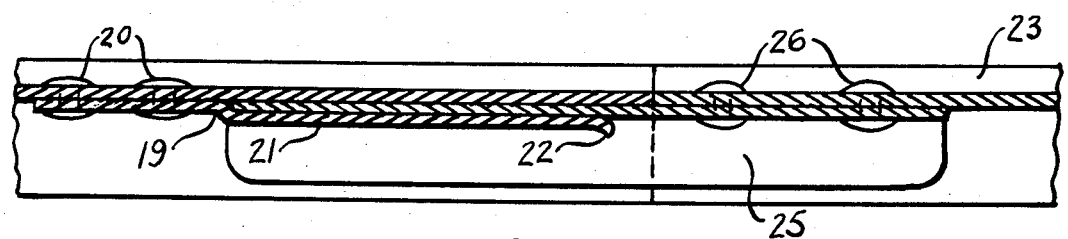
Fig.5
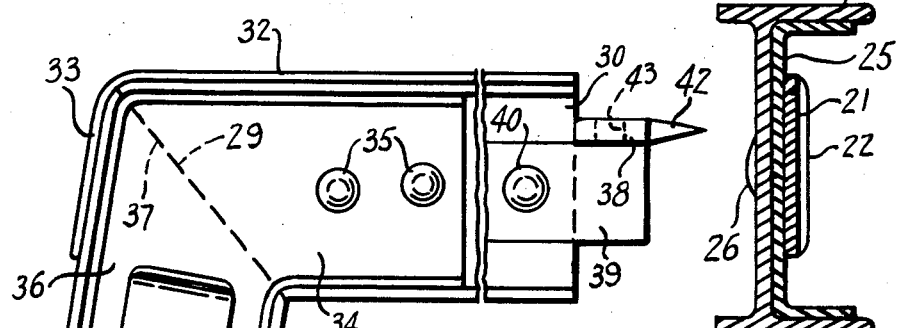
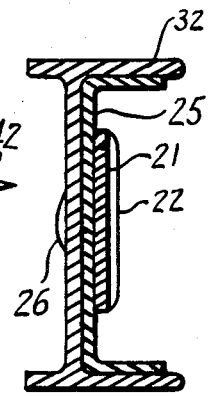
Fig.7    Fig.6
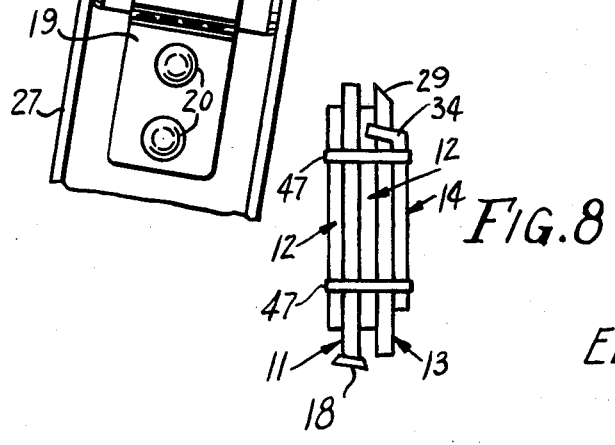
Fig.8
INVENTOR.
EDWARD RALPH MAXWELL
BY Victor J. Evans & Co.
ATTORNEYS.

3,703,939

PORTABLE TREE STAND

BACKGROUND OF THE INVENTION

Field of the Invention

The present invention relates to portable stands for attachment to a tree for a hunters use to observe game.

Summary of the Invention

The tree stand includes a plurality of ladder forming sections which can be readily assembled in end to end relation and having a seat detachably secured to the upper end. A spike carrying bar is rigidly secured to the seat frame and a turnbuckle tightened chain is secured to opposite ends of the bar and encompasses a tree in order to draw the spikes of the spike bar into the tree.

The primary object of the invention is to provide a light weight portable tree stand which can be readily erected and secured to a tree to form a safe stand for a hunter.

Other objects and advantages will become apparent in the following specification when considered in the light of the attached drawings.

Brief Description of the Drawings

FIG. 1 is a front elevation of the invention shown attached to a tree;

FIG. 2 is a side elevation of the structure illustrated in FIG. 1;

FIG. 3 is a top plan view of the stand;

FIG. 4 is an enlarged fragmentary side elevation of one of the joints;

FIG. 5 is a longitudinal sectional view taken along the line 5—5 of FIG. 4 looking in the direction of the arrows;

FIG. 6 is a transverse sectional view taken along the line 6—6 of FIG. 4 looking in the direction of the arrows;

FIG. 7 is an enlarged fragmentary side elevational view of the joint between the upper ladder section and the seat section shown partially broken away and in section for convenience of illustration; and FIG. 8 is an elevational view of the disassembled stand bundled for carrying.

DESCRIPTION OF THE PREFERRED EMBODIMENT

Referring now to the drawings in detail wherein like reference characters indicate like parts throughout the several figures the reference numeral 10 indicates generally a portable tree stand constructed in accordance with the invention.

The portable tree stand 10 includes a base ladder section indicated generally at 11, a pair of intermediate ladder sections indicated generally at 12, an upper ladder section indicated generally at 13 and a seat section indicated generally at 14.

The base ladder section 11 includes a pair of extruded side rails 15, 16 connected by a pair of rungs 17. The side rails 15, 16 are provided with feet 18 for engagement with the ground. A spring clip 19 is secured by a pair of rivets 20 to the upper end portions of the rails 15, 16 for reasons to be assigned. The spring clip 19 has an offset portion 21 which is spaced outwardly from the rail 16 and parallel thereto. The offset portion 21 is flared at 22 on its outer end for reasons to be assigned.

THe intermediate ladder sections 12 include a pair of extruded aluminum side rails 23, 24 connected by a pair of rungs 17. A channel member 25 is secured to the lower end of the rails 23, 24 by a pair of rivets 26. The channel member 25 projects below the end of the rails 23, 24 and is adapted to engage in the rail 16 under the offset portion 21 of the spring clip 19. The upper end of the intermediate ladder section 12 is provided with spring clips 19 cooperating with channel members 25 of the section 12 thereabove.

The upper ladder section 13 includes a pair of upright parallel side rails 27, 28 connected by a pair of horizontal rungs 17. The upper ends of the side rails 27, 28 are beveled at 29 for reasons to be assigned. The lower ends of the side rails 27, 28 are equipped with channel members 25 for cooperation with the spring clip 19 of the upper end of the intermediate section 12. The upper end of the rails 27, 28 are each provided with spring clips 19 for reasons to be assigned.

The seat section 14 includes a pair of extruded aluminum horizontal side rails 30, 31 connected by a flat seat panel 32. The seat panel 32 has a downwardly projecting flange 33 integrally formed on the forward edge thereof to assist in strengthening the set section 14. A channel member 34 is secured to each of the side rails 30, 31 by a pair of rivets 35. The channel member 34 has an angularly depending leg 36 which is adapted to engage in the upper ends of the side rails 27, 28 to cooperate with the spring clips 19 to secure the seat section 14 to the upper ladder section 13. The side rails 30, 31 have their outer ends beveled at 37 to cooperate with the beveled end 29 of the side rails 27, 28 as is clearly shown in FIG. 7. An elongate generally rectangular horizontal bar 38 extends transversely of the seat section 14 and has a pair of short mounting members 39 welded thereto and extending horizontally therefrom. The mounting members 39 are secured to the side rails 30, 31 by rivets 40 which extend therethrough. The bar 38 has an integral tooth 41 formed centrally thereon and projecting outwardly from the seat section 14. A pair of teeth 42 are integrally formed on the bar 38 on opposite sides of the tooth 41 and have a length greater then the length of the tooth 41.

The bar 38 extends beyond the rails 30, 31 at each end thereof and is provided with a bore 43 at each end thereof to receive a turnbuckle 44 connected thereto. A chain 45 is detachably connected to the turnbuckles 44 and is adapted to extend about the trunk of a tree 46.

In FIG. 8 a bundle of the portable stand sections is illustrated connected together by removeable straps 47.

In the use and operation of the invention the hunter carries the bundle illustrated in FIG. 8 into the woods until he finds a suitable tree 46 for the erection of the portable tree stand 10. The straps 47 are removed and one intermediate section 12 is assembled with the base section 11 and a second intermediate section 12 is assembled on top of the first intermediate section 12. The upper ladder section 13 is then assembled with the uppermost intermediate section 12 and finally the seat section 14 is assembled onto the upper end of the upper ladder section 13. The assembled stand is then engaged against a tree 46 and the hunter passes the chain 45 around the tree 46 connecting it to the turnbuckles 44 at each end. The turnbuckles 44 are then tightened drawing the teeth 41, 42 into the wood of the tree locking the seat section 14 thereto.

While the invention has been disclosed and described using extruded aluminum side rails it should be understood that the side rails may also be formed of tubular aluminum material when desired.

Having thus described the preferred embodiment of the invention it should be understood that numerous structural modifications and adaptations may be resorted to without departing from the spirit of the invention.

What is claimed is:

1. A portable tree stand comprising a base ladder section including a pair of side rails having longitudinally extending channels, an intermediate ladder section including a pair of side rails having longitudinally extending channels, an upper ladder section including a pair of side rails having longitudinally extending channels, means for detachably securing the intermediate section to said base section and said upper section with said sections in aligned relation including a channel member secured in the channel side rail of one of said sections and projecting longitudinally to detachably engage in the channel side rail of another of said sections and a spring retainer on the other of said sections for engaging said channel member, a seat section including a channel side rail and a channel member secured in said channel side rail of said seat section and projecting longitudinally to detachably engage in the channel side rail of said upper section, and a spring retainer on said upper section for engaging said channel member, a horizontal bar rigidly secured to said seat section, a plurality of teeth integrally formed on said bar and projecting outwardly therefrom oppositely of said seat, a pair of turnbuckles secured to opposite ends of said bar, and a tree encompassing chain detachably secured to opposite ends of said turnbuckle for securing said spikes to said tree with said spikes embedded therein.

2. A device as claimed in claim 6 wherein the means for securing said ladder sections together includes a projecting channel member on the terminal end of one of said members and a cooperating spring clip on the terminal end of the other of said members.

3. A device as claimed in claim 1 wherein each of said ladder sections include a pair of extruded aluminum side rails rigidly connected by a pair of spaced apart horizontally extending rungs.

4. A device as claimed in claim 1 wherein said bar is rigidly connected to said side rails.

* * * * *